(12) United States Patent
Repasi et al.

(10) Patent No.: US 7,870,394 B2
(45) Date of Patent: Jan. 11, 2011

(54) METHOD AND SYSTEM TO SCAN FIRMWARE FOR MALWARE

(75) Inventors: Rolf Repasi, Sunrise Beach (AU); Simon Clausen, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 863 days.

(21) Appl. No.: 11/803,875

(22) Filed: May 16, 2007

(65) Prior Publication Data

US 2007/0277241 A1 Nov. 29, 2007

Related U.S. Application Data

(60) Provisional application No. 60/808,916, filed on May 26, 2006.

(51) Int. Cl.
*H04L 9/00* (2006.01)
(52) U.S. Cl. .................... 713/188; 726/22; 726/23; 726/24; 726/25

(58) Field of Classification Search .............. 713/188; 726/22–25
See application file for complete search history.

(56) References Cited

U.S. PATENT DOCUMENTS

| 6,907,524 | B1 * | 6/2005 | Huntington et al. | 713/164 |
|---|---|---|---|---|
| 7,549,055 | B2 * | 6/2009 | Zimmer et al. | 713/188 |
| 2002/0166059 | A1 * | 11/2002 | Rickey et al. | 713/200 |
| 2003/0154392 | A1 * | 8/2003 | Lewis | 713/200 |
| 2007/0016941 | A1 * | 1/2007 | Gonzalez et al. | 726/9 |
| 2010/0005531 | A1 * | 1/2010 | Largman et al. | 726/24 |

\* cited by examiner

*Primary Examiner*—Abdelmoniem Elamin
(74) *Attorney, Agent, or Firm*—Holland & Hart LLP

(57) ABSTRACT

A method, system and computer program product for scanning firmware of a processing system for malware. The method (400) comprises obtaining a copy of firmware stored in the processing system (410); and analysing the copy of the firmware to determine if the firmware has been modified or infected by malware (420).

18 Claims, 5 Drawing Sheets

METHOD AND SYSTEM TO SCAN FIRMWARE FOR MALWARE

This application claims the benefit of priority from Provisional Application Ser. No. 60/808,916, filed on May 26, 2006, which is hereby incorporated by reference in its entirety.

COPYRIGHT

A portion of the disclosure of this patent document contains material that is subject to copyright protection. The copyright owner has no objection to the facsimile reproduction by anyone of the patent disclosure, as it appears in a Patent Office patent files or records, but otherwise reserves all copyrights whatsoever.

TECHNICAL FIELD

The present invention generally relates to a method, system and/or computer readable medium of instructions for scanning firmware of a processing system for malware, and removing malware from the firmware of the processing system.

BACKGROUND ART

As used herein a "threat" comprises malicious software, also known as "malware" or "pestware", which comprises software that is included or inserted in a part of a processing system or processing systems for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

An entity can comprise, but is not limited to, a file, an object, a class, a collection of grouped data, a library, a variable, a process, and/or a device.

Flash memory is a form of EEPROM (Electrically Erasable Programmable Read-Only Memory) that allows multiple locations of memory to be erased or written in one programming operation. Examples of components of a processing system which utilise Flash memory comprise the System BIOS, Video card firmware, and Optical storage firmware.

System BIOS (b(asic) i(nput/)o(utput) s(ystem)) is a set of routines stored in read-only/flash memory that enable a computer to start the operating system and to communicate with the various devices in the system, such as disk drives, keyboard, monitor, printer, and communications ports.

Firmware is software that is embedded in a hardware device of the processing system. Hardware devices which comprise firmware are referred throughout the specification as firmware devices. Firmware is often provided on Flash ROMS or as a binary image file that can be uploaded onto existing hardware. An example of firmware is the BIOS of a processing system.

A cryptographic hash function is a mathematical function that maps values from a large (or even very large) domain into a smaller range, and is a one-way function in that it is computationally infeasible to find any input which maps to any pre-specified output. Furthermore, the function is collision-free in that it is computationally infeasible to find any two distinct inputs which map to the same output.

A checksum is a digit representing the sum of the digits in an instance of digital data. The checksum can be used to check whether errors have occurred in transmission or storage.

Disassembly, in computer programming, is the result when machine code is translated back into assembly language. The term can also refer to the process of creating the disassembly, i.e. using and interacting with a disassembler.

A System Administrator is a person in charge of managing and maintaining a computer system.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive. A terminal is broadly herein referred to as a processing system.

An information source can comprise a server, or any type of terminal, that may be associated with one or more storage devices that are able to store information or data, for example in one or more databases residing on a storage device. The exchange of information (i.e. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

Current malware scanning engines scan the file system of a processing system (i.e. the hard drive of the processing system) and input storage mediums (such as a Compact Disk or Floppy Disk) which can be read by input devices of the processing system (such as a Compact Disk Drive or a Floppy Disk Drive).

Due to current malware scanning practices, authors of malware have been seeking alternate methods to infect a processing system with malware which may not be easily detected. One such alternate method is to modify the firmware of one or more EEPROM devices of the processing system. As EEPROM devices are generally used prior to the processing system booting to an operating system, malware that modifies an EEPROM device can effect low level functionality of the processing system.

Furthermore, if a user suspects that the firmware of an EEPROM device has been altered by malware, the user must delete the modified firmware from the EEPROM device and reinstall the correct firmware. The reinstallation process of an EEPROM device generally requires the user to have a detailed knowledge of the specific EEPROM device. If the user, for example, attempts to reinstall the incorrect firmware for a BIOS of a processing system, the BIOS chip or the motherboard can be rendered useless, thus requiring the user to purchase a new BIOS chip or motherboard for the processing system.

Therefore, there exists a need for a method, system, computer readable medium of instructions, and/or a computer program product to scan firmware of a processing system for malware which addresses or at least ameliorates problems inherent in the prior art.

There also exists a need for a method, system, computer readable medium of instructions, and/or a computer program product to repair firmware which has been damaged by malware which addresses or at least ameliorates problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In one broad form there is provided a method of scanning firmware of a processing system for malware, wherein the method comprises:

obtaining a copy of firmware stored in the processing system; and analysing the copy of the firmware to determine if the firmware has been modified by malware.

In one form, the method comprises:

storing uncompromised firmware; and in the event that malware has been determined to have modified the copy of the firmware, repairing the firmware using the uncompromised firmware.

In another form, the step of analysing the copy of the firmware is performed using a detection module, wherein the detection module comprises a plurality of submodules comprising at least one of a cryptographic hash module, a checksum module, a disassembly module, and a pattern matching module, wherein the method comprises analysing, using the plurality of submodules, the copy of the firmware to determine if the firmware has been modified by malware.

Optionally, the method comprises:

generating, using the cryptographic hash module, a cryptographic hash value of the copy of the firmware; and comparing the cryptographic hash value to a database to determine whether the firmware has been modified by malware, wherein the database comprises a plurality of cryptographic hash values indicative of at least one of malicious entities and non-malicious entities.

In one embodiment, the method comprises:

generating, using the checksum module, a checksum value of the copy of the firmware; and comparing the checksum value to a list to determine whether the entity is malicious, wherein the list comprises a plurality of checksum values associated with at least one or malicious entities and non-malicious entities.

In another embodiment, wherein the method comprises:

disassembling, using the disassembly module, at least a portion of the copy of the firmware; and performing a comparison, using the pattern matching module, between the disassembled entity and a list of patterns associated with malicious activity.

In an optional embodiment, in the event the analysis indicates that the firmware has not been modified by malware, the method comprises storing an uncompromised copy of the firmware.

In one form, in the event the analysis indicates that the firmware has been modified by malware, the method comprises:

retrieving the uncompromised copy of the firmware; and copying the uncompromised copy of the firmware for a firmware device containing the modified firmware.

In another form, the method comprises:

obtaining a list of firmware devices in communication with the processing system; and iteratively analysing the firmware for each firmware device in the list.

In one aspect the method comprises:

retrieving the uncompromised copy of the firmware for a firmware device; and performing a comparison between the firmware of the firmware device and the retrieved uncompromised copy of the firmware to determine if the firmware has been modified by malware.

In another aspect, in the event that the firmware is determined to have been modified by malware, the method comprises:

generating a report indicating that a firmware device comprises firmware modified by malware; and transferring the report to a server processing system.

In one embodiment, the report is indicative of:

the copy of the modified firmware;

a firmware device identity;

a firmware device associated with the firmware; and an identity associated with the malware which modified the firmware.

In another embodiment the method comprises displaying the report using the processing system.

In one form, repairing the firmware comprises configuring the processing system to reboot and execute a bootable program prior to booting an operating system installed on the processing system, wherein the bootable program is configured to enable modifications to be performed to the firmware.

In another broad form there is provided a computer program product for a processing system, the computer program product comprising a computer readable medium having a computer program recorded therein or thereon, the computer program product being configured to scan firmware of the processing system for malware, wherein the computer program product configures the processing system to:

copy the firmware stored in the processing system; and analyse the copy of the firmware to determine if the firmware has been modified by malware.

In another broad form there is provided a system to scan firmware of a processing system for malware, wherein the system comprises:

a copy module to copy the firmware stored in the processing system; and an analysis module to analyse the copy of the firmware to determine if the firmware has been modified by malware.

In another form, the system includes a storage module configured to store uncompromised firmware; and a repair module configured to repair the firmware using the uncompromised firmware in the event that malware has been determined to have modified the copy of the firmware.

In another form, the analysis module includes a detection module, wherein the detection module comprises a plurality of submodules comprising at least one of a cryptographic hash module, a checksum module, a disassembly module, and a pattern matching module.

In another broad form there is provided a computer readable medium of instructions to perform any of the above methods, and/or for use with any of the above systems

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

Figure 1:
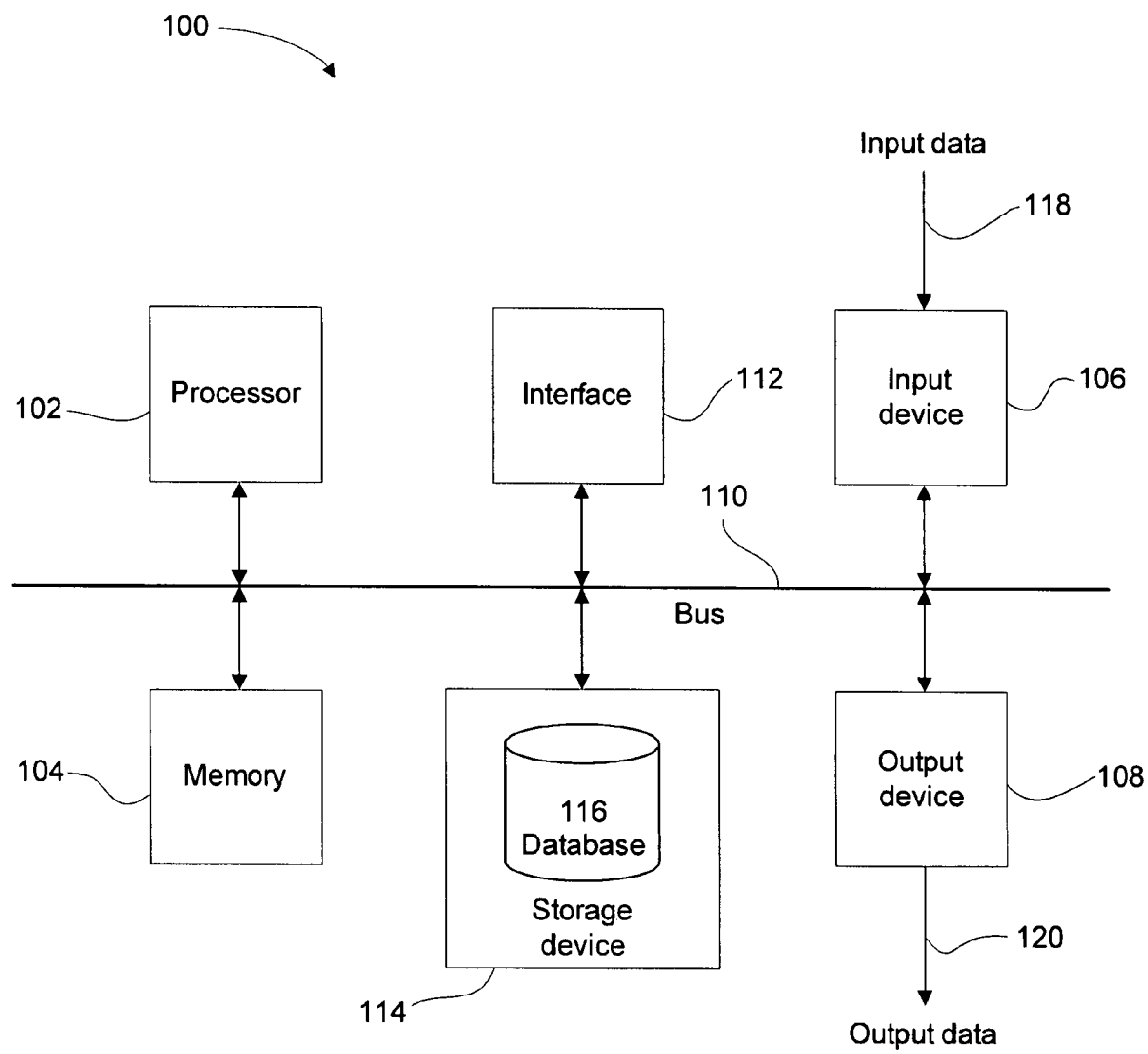
FIG. 1 illustrates a functional block diagram of an example of a processing system that can be utilised to embody or give effect to a particular embodiment.

A particular embodiment of the present invention can be realised using a processing system, an example of which is shown in FIG. 1. In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

The processing system 100 may be a part of a networked communications system. Processing system 100 could connect to network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Figure 2A:
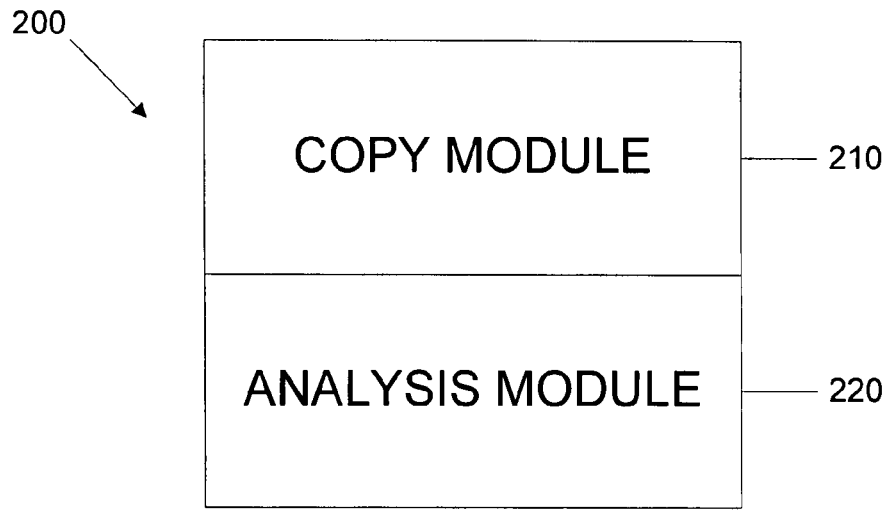
FIG. 2A illustrates a block diagram of an example system for scanning firmware of a processing system for malware.

Referring now to FIG. 2A, a block diagram is shown representing an example system 200 to scan firmware of a processing system 100 for malware. In particular, the system 200 comprises a copy module 210, and an analysis module 220.

Figure 2B:
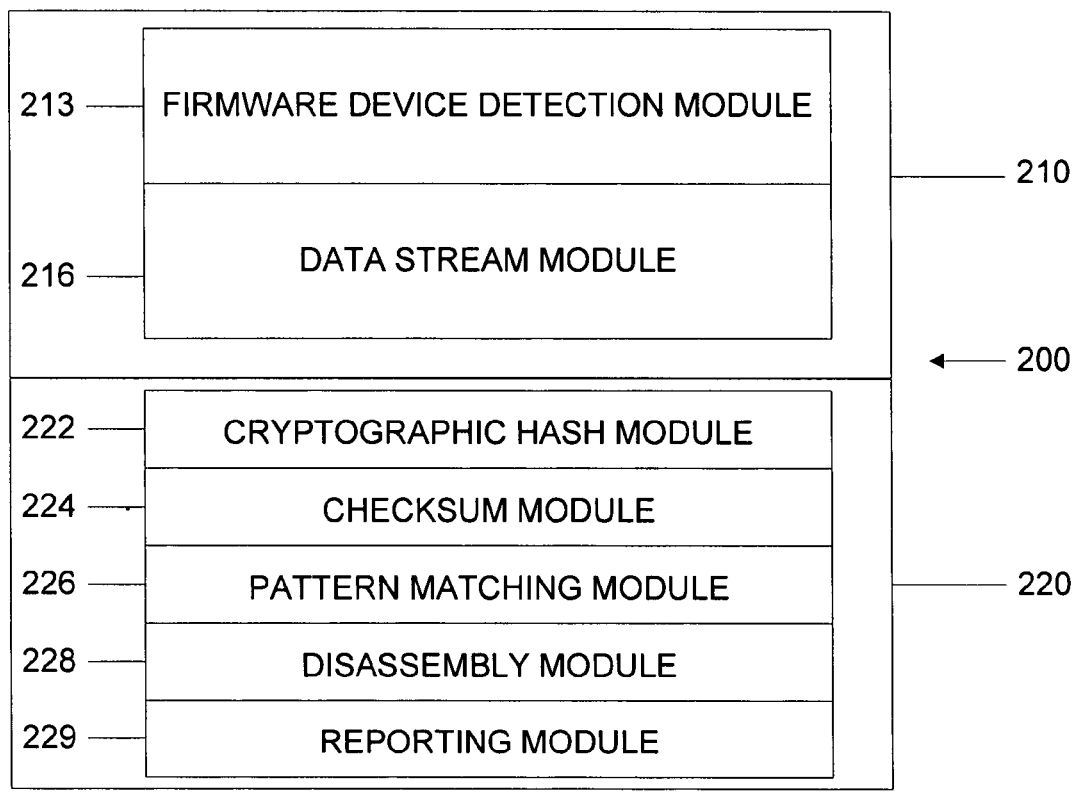
FIG. 2B illustrates a more detailed block diagram of the system of FIG. 2A.

Referring now to FIG. 2B, a more detailed block diagram is shown of the system 200 of FIG. 2A. In particular, the copy module comprises a number of sub-modules comprising a firmware device detection module 213 and a data stream module 216. Also shown in FIG. 2B is the analysis module which comprises a number of sub-modules comprising a cryptographic hash module 222, a checksum module 224, a pattern matching module 226, a disassembly module 228 and a reporting module 229.

Figure 3A:
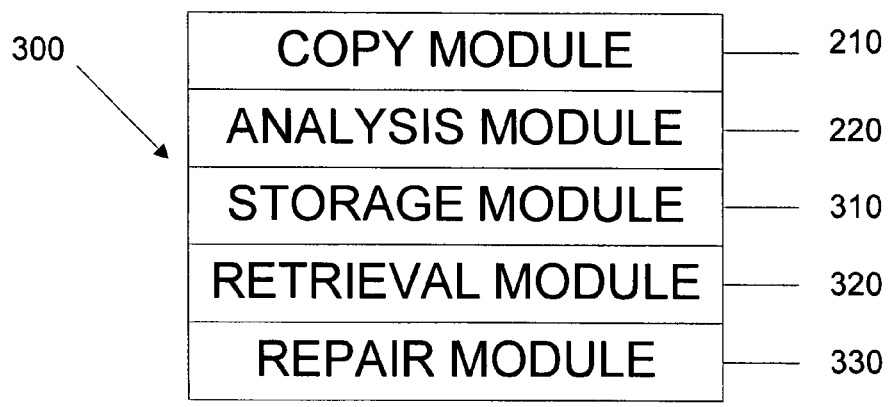
FIG. 3A illustrates a block diagram of an example system for detecting and repairing firmware of a processing system which has been compromised by malware.

Referring now to FIG. 3A, a block diagram is shown representing an example system 300 to detect and repair firmware of a processing system 100 which has been compromised by malware. In particular, the system 300 comprises the copy module 210, the analysis module 220, a storage module 310, a retrieval module 320, and a repair module 330.

Figure 3B:
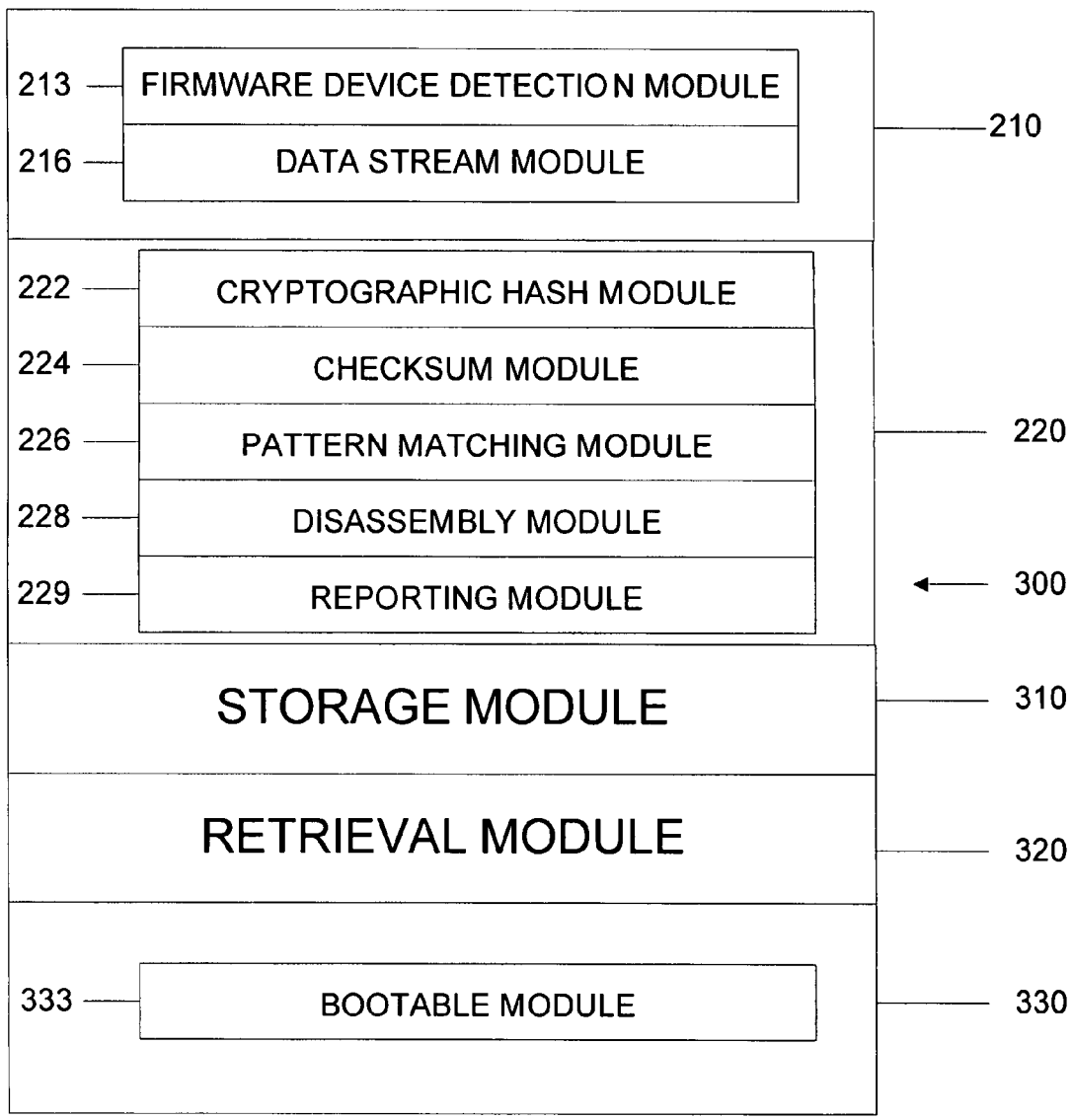
FIG. 3B illustrates a more detailed block diagram of the system of FIG. 3B.

Referring now to FIG. 3B, a more detailed block diagram of the system 300 is shown. In particular, the copy module comprises sub-modules of the firmware device detection module 213 and the data stream module 216. The analysis module comprises sub-modules of the cryptographic hash module 222, the checksum module 224, the pattern matching module 226, the disassembly module 228 and the reporting module 229. Also, the repair module 330 comprises bootable program 333.

Each of these modules 210, 220, 310, 320, 330 can be implemented in software or hardware. If the modules 210, 220, 310, 320, 330 are implemented in software, the modules 210, 220, 310, 320, 330 can be designed to operate on any type of processing system 100. If the modules 210, 220, 310, 320, 330 are implemented in software, the modules 210, 220, 310, 320, 330 can be designed for computer systems which operate using specific operating systems such as WINDOWS™ or Linux. Those of skill in the art can easily adapt these implementations for other types of operating system or computer systems.

Referring first to the copy module 210, it is responsible for copying the firmware stored in firmware devices of the processing system 100. The firmware stored in the processing system 100 may be compromised by malware, and therefore the copy module 210 copies the firmware for analysis. The copy module 210 can comprise a number of sub-modules. In particular, the copy module 210 can comprise a firmware device detection module 213, and a data-stream module 216.

The copy module 210 is configured to determine one or more firmware devices of the processing system 100. The copy module 210 can initiate the firmware device detection module 213 which generates a list of the one or more firmware devices of the processing system 100. The firmware device detection module 213 may call a device manager of the specific operating system used on the processing system 100 to populate the list. Example firmware devices of the processing system 100 which can populate the list can comprise a BIOS chip, a video card, an optical storage device, a mobile phone in data communication with the processing system 100, a scanner, an MP3 player, a USB device, a digital camera, or any other device which comprises EEPROM which could be susceptible to a malware attack.

The firmware device detection module 213 of the copy module 210 is configured to determine a size of memory storage of the firmware device, and a firmware device identity for each firmware device in the list. The firmware device detection module 213 of the copy module 210 can be configured to store the size of the memory storage and firmware device identity as a record associated with each firmware device in the list. In this instance, the list may in the form of a table comprising records for each firmware device of the processing system 100.

The copy module 210 can be configured to allocate an amount of memory equivalent to the size of the memory storage for each firmware device in the list. The memory allocated by the copy module 210 may be part of the RAM of the processing system 100. Alternatively, the memory allocated by the copy module 210 may be isolated memory storage of the processing system 100 to reduce the likelihood of malware spreading throughout the processing system 100.

The copy module 210 can be configured to attempt to open a data stream with one of the firmware devices in the list. The copy module 210 can open the data stream using the data stream module 216. In one form, the data stream module 216 uses a firmware device identity from the list to determine an initiation signal for the respective firmware device in order to open a data stream with the firmware device. In one form, the data stream module 216 may refer to a database which can be queried using the firmware device identity in order to determine the initiation signal for the respective firmware device. In one potential form, the database may be remotely accessed using a communication network, such as the world wide web.

The data stream module 216 of the copy module 210 is configured to transfer the initiation signal to the firmware device in order to open a data stream with the firmware. Furthermore, the data stream module 216 can be configured to determine a read signal for the particular firmware device and transfer the read signal to the firmware device, such as to request the firmware device to transfer a copy of the firmware. The data stream module of the copy module may define parameters indicating the boundaries of the memory of the firmware device which are required to be transferred.

The data stream module 216 of the copy module can be configured to store the copy of the firmware of the respective firmware device in the allocated memory of the processing system 100.

The copy module 210 can be configured to enumerate through the list of firmware devices such that copies of the firmware in each respective firmware device are copied to the allocated memory of the processing system 100. The copy module can be configured to pass control to the analysis module 330 once the firmware has been copied.

The analysis module 220 is configured to analyse the copy of the firmware to determine if the firmware has been modified by malware. The analysis module 220 may comprise a number of sub-modules which can be used to perform an analysis of the copy of the firmware for each firmware device of the processing system 100. In particular, the analysis module 220 can comprise one or more of the following sub-modules: a cryptographic hash module 222, a checksum module 224, a pattern matching module 226, and a disassembly module 228. The analysis module 220 can be configured to use one or more of these sub-modules exclusively or in combination to determine a firmware signature of the copy of the firmware for a particular firmware device.

The analysis module 220 can be configured to compare the firmware signature to a whitelist database having firmware signatures of uncompromised firmware devices in order to determine whether the firmware of a respective firmware device is uncompromised. The analysis module 220 can additionally or alternative be configured to compare the firmware signature to a blacklist database having firmware signatures of compromised firmware devices in order to determine whether the firmware of a respective device is compromised. If the analysis module 220 has been configured to use the blacklist database, the analysis module 220 can be configured to determine the malware which caused the firmware to be compromised.

The analysis module 220 can also comprise a reporting module 229 which is configured to report the detection of the compromised firmware. A report may be provided to the user of the processing system 100 indicating the compromise to the firmware. Additionally, or alternatively, the report may be transferred to a server, such that the server can monitor an outbreak of particular malware. In this particular instance, the analysis module, using the reporting module 229, can generate reporting data indicative of the copy of the firmware, the firmware device identity, and firmware device, and transfer the reporting data to the server. If the analysis module 220 can determine which malware has caused the firmware of the firmware device to be compromised, the analysis module 220 may also generate the reporting data, using the reporting module 229, to be indicative of an identity of the malware responsible for the firmware being compromised.

Referring now to the sub-modules of the analysis module 220, the cryptographic hash module 222 of the analysis module 220 is configured to generate a cryptographic hash value using the copy of the firmware for the particular firmware device. As the cryptographic hash value can be used an identity, the cryptographic hash value can be used in comparisons with a database to determine whether the firmware of a firmware device has been compromised.

The checksum module 224 of the analysis module is configured to determine a checksum for the firmware of a particular firmware device. The checksum can be compared to a database (blacklist and/or whitelist) to determine whether the firmware has been modified.

The pattern matching module 226 of the analysis module is configured to search the copies of the firmware for particular patterns of strings or instructions which are indicative of malware. The pattern matching module 226 may operate in combination with the disassembly module 228 of the analysis module 220. The disassembly module 228 is configured to disassemble the binary code stored of the firmware such that disassembly module determines processing system instructions of the firmware. The processing system instructions of the firmware can then be used by the pattern matching module 226 to determine whether firmware has been compromised by malware. Although strings of instructions can be compared by the pattern matching module 226, the pattern matching module 226 may be configured to perform functional comparisons of groups of instructions to determine whether the functionality of the firmware is indicative of compromised firmware The storage module 310 of the system 300 is configured to store uncompromised firmware. In one particular form, the storage module 310 is configured to store an uncompromised copy of the firmware in response to the analysis module 220 determining that a particular firmware device comprises uncompromised firmware. The storage module 310 may store the uncompromised copy of the firmware in protected memory of the processing system 100. In one form the processing system may store the copy of the firmware to read only memory such as a CD-ROM.

The retrieval module 320 of the system 300 is configured to retrieve a stored copy of uncompromised firmware which was stored by the storage module 310. The retrieval module 320 may be configured to use a firmware device identity in order to retrieve the uncompromised copy of firmware from memory of the processing system 100.

The repair module 330 of the system 300 is configured to repair the firmware using the uncompromised firmware retrieved by the retrieval module 320. The repair module 320 can be configured to install the uncompromised firmware if provided in the form of an executable object. Alternatively, the repair module 320 may initiate the data stream module 216 of the copy module 210 to open a data stream to the particular firmware device, and thus copy the uncompromised firmware over the compromised firmware of the firmware device. In one form, the repair module 330 may initiate the copy module 210 to copy only a number of blocks of uncompromised data to the firmware device to increase efficiency.

In one particular form the repair module 330 may be provided in the form of a bootable program 333 which is initiated when the processing system 100 is booted. The bootable program 333 can be provided at particular sector of the hard drive of the processing system 100. Additionally, or alternatively, the bootable program 333 may be provided as a removable input medium such as a CD-ROM, floppy disk, or USB drive. The bootable program 333 can be configured to be booted prior to the operating system of the processing system 100 booting. The bootable program 333 is configured to allow modifications to particular firmware devices such as the BIOS of the processing system 100.

Figure 4:
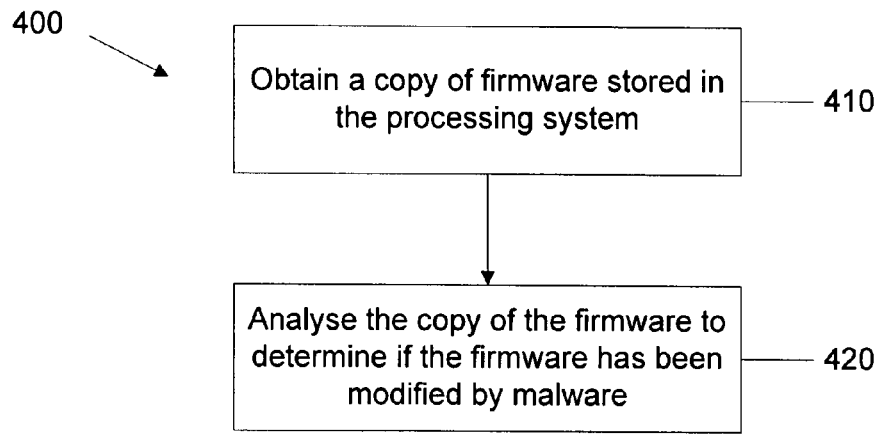
FIG. 4 illustrates a flow chart of an example method for scanning firmware of a processing system for malware.

Referring now to FIG. 4, there is shown a flowchart representing an example of a method 400 of scanning firmware of a processing system for malware.

In particular, at step 410 the method 400 comprises obtaining a copy of firmware stored in the processing system. At step 420, the method 400 comprises analysing the copy of the firmware to determine if the firmware has been modified or infected by malware.

Figure 5:
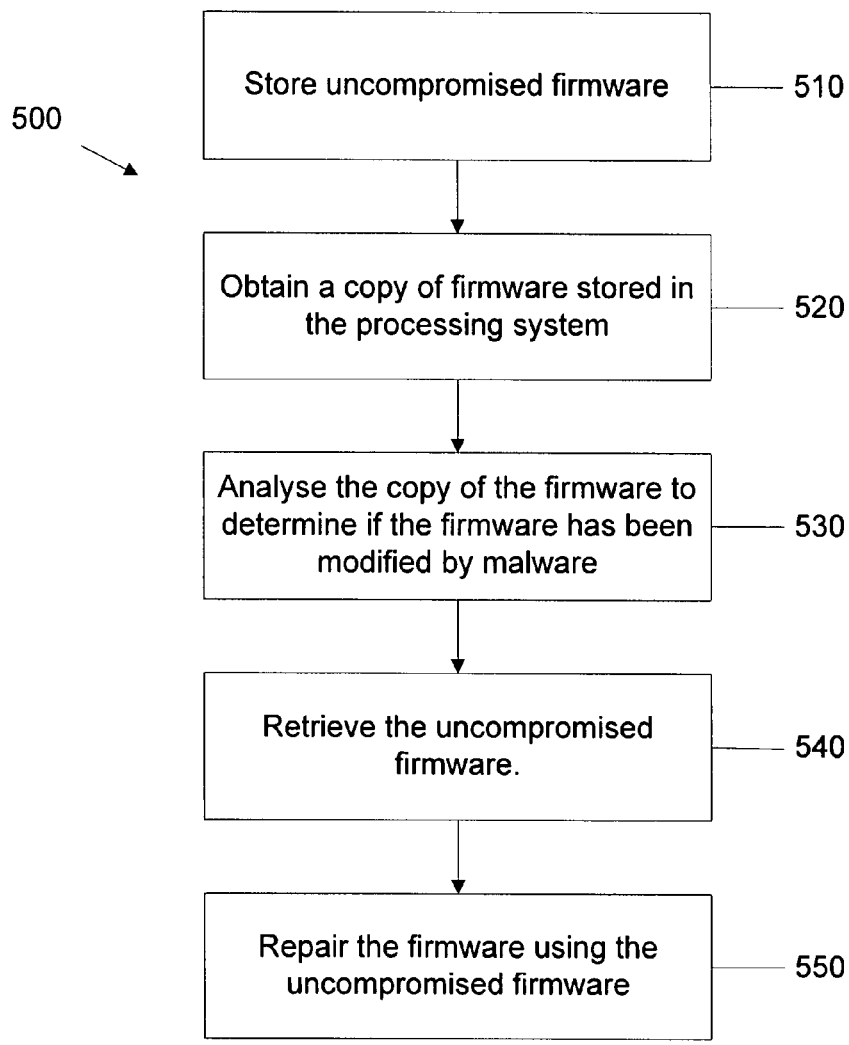
FIG. 5 illustrates a flow chart of an example method for detecting and repairing firmware of a processing system which has been compromised by malware.

Referring now to FIG. 5, there is shown a flowchart representing an example of a method 500 of detecting and repairing firmware of a processing system which has been compromised by malware.

In particular, at step 510 the method 500 comprises storing uncompromised firmware. At step 520, the method 500 comprises obtaining a copy of the firmware stored in the processing system. At step 530 the method 500 comprises analysing the copy of the firmware stored in the processing system 100 to determine if the firmware has been modified or infected by malware. In the event that the firmware has been compromised by malware, the method 500 comprises at step 540 retrieving the uncompromised firmware. At step 550 the method comprises repairing the firmware using the uncompromised firmware.

Figure 6:
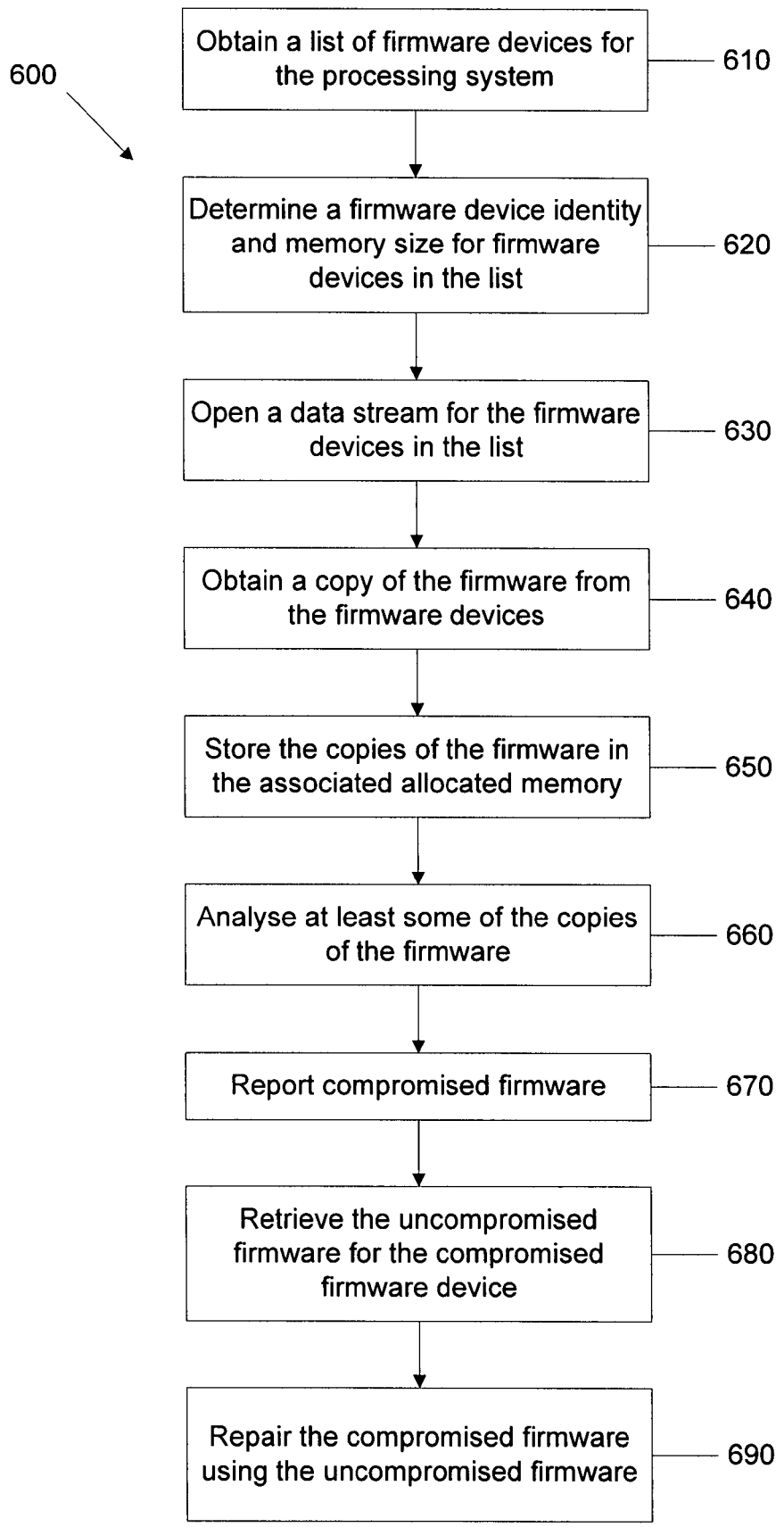
FIG. 6 illustrates a flow chart of an example method for scanning, detecting and repairing firmware of a processing system which has been compromised by malware.

Referring to FIG. 6, there is shown a flowchart representing a more detailed example of a method 600 of scanning firmware of the processing system 100, detecting firmware compromised by the malware, and repairing the firmware of the processing system 100.

In particular, at step 610 the method comprises obtaining a list of firmware devices for the processing system 100. This can be performed by the firmware device detection module 213 querying a device manager of the processing system 100 in order to obtain a list of devices for the processing system 100. The list can be filtered by the firmware device detection module 213 in order to determine the list of firmware devices.

At step 620, the method comprises determining a firmware device identity and memory size for each firmware device in the list. The firmware device detection module 213 can determine the device identity and memory size and the copy module 210 may use this data to allocate processing system 100 memory. Each allocated piece of processing system 100 memory can be associated with the firmware device identity of a respective firmware device.

At step 630, the method comprises opening a data stream for at least some of the firmware devices in the list. This can be performed by the data stream module 216 as indicated earlier. The data stream module 216 may determine an initiation signal which can be transferred to the firmware device in order to open a data stream with the firmware device.

At step 640, the method comprises obtaining a copy of the firmware from at least some of the firmware devices. This can be performed by the data stream module 216 transferring a read signal to the firmware device in order to request the firmware device to transfer a copy of the firmware for the respective device to the data stream module 216 of the copy module 210.

At step 650, the method comprises storing the copies of the firmware in the associated allocated memory. The data stream module 216 for a particular firmware device may be associated with a particular memory allocation for the respective firmware device. As such, the copy of the firmware received by the data stream module 216 is directed to the associated allocated memory.

At step 660, the method comprises analysing at least some of the copies of the firmware. In particular, the method can comprise initiating the analysis module 220 comprising one or more of the cryptographic hash module 222, the checksum module 224, the pattern matching module 226, and the disassembly module 228 to perform an analysis of at least some of the copies of the firmware. The retriever module 320 can also be used to retrieve uncompromised copies of firmware from the storage module 310 which correspond to the firmware device identity, such as to allow a comparison of the uncompromised firmware with the copied firmware. Blacklist databases and whitelist databases can also be used to determine a particular type of malware that may have caused a modification to the firmware.

Optionally at step 670, the method can comprise reporting compromised firmware. This can be performed by the reporting module 229 which can report the compromised firmware to the user of the processing system 100 using an output device, such as the display of the processing system, and/or the reporting module 229 can report the compromised firmware to the server.

If the analysis module 220 has determined that at least some of the firmware has been compromised with malware, the method comprises at step 680 retrieving the uncompromised firmware for the compromised firmware device. The retrieval of the uncompromised firmware can be performed by the retriever module 320 using the respective device identity for the firmware. The retrieval module 320 retrieves the uncompromised firmware from the storage module 310.

At step 690, the method comprises repairing the compromised firmware using the uncompromised firmware. This can be performed by the repairer module 330 using the uncompromised firmware to repair the compromised firmware. The repairer module 330 can use the data stream module 216 to open a data stream to the compromised firmware device, and then copy the uncompromised firmware to the firmware device. Optionally, one or more blocks of the uncompromised firmware may be copied to the firmware device in order to repair the firmware.

For some particular forms of firmware, such as the BIOS of a processing system 100, the processing system 100 may need to be rebooted in order for the repairer module to repair the compromised firmware. The repairer module 216 may be provided in the form of a bootable program 333 that is loaded before the operating system of the processing system 100, in order to modify the BIOS. The repairer module may be provided on a removable medium such as a floppy disk, CD-ROM or USB drive. Alternatively, the Master Boot Record may be modified to redirect the control to the repair module on a predetermined sector of the hard drive of the processing system 100. Once the repairer module 330 has been initiated, the repairer module 330 copies at least a portion of the uncompromised firmware to the compromised firmware device.

Optionally, if data streams are still open between the data stream module 216 and the firmware devices, the data streams are closed at step 690. For particular devices, the data stream module 216 may send a close signal to the firmware device. The data stream module 216 may determine the close signal similarly to determining the open signal for the particular firmware devices.

The method can performed by enumerating through the list of firmware devices using a looping technique. This looping technique is illustrated by the following example pseudo code which can be used to implement the above described method.

```
Function Scan(scan_mode);
Begin
    Call enumerate_flashable_devices(list);
    For each device in list do Begin
        Size = get_flashable_size(device);
        DeviceId = get_device_id(device);
        Call Allocate_memory(snapshot, size);
        Call Allocate_memory(current, size);
        Call dump_flash_memory(device, current);
        If scan_mode == NOTIFY_OF_CHANGES Then Begin
            If retrieve_snapshot(DeviceId, snapshot) Then Begin
                If snapshot != current Then Begin
                    User_response = alert_user(DeviceId);
                    If User_response = RESPONSE_OK Then
                    Begin
                        Call save_snapshot(DeviceId, current);
                    End Else Begin
                        Call restore_snapshot(DeviceId,
                        snapshot);
                    End;
```

-continued

```
            End;
        End;
    End;
    Scan_result = scan_memory(current);
    If Scan_result == RESULT_CLEAN Then Begin
        Call save_snapshot(DeviceId, current);
    End Else Begin
        User_response = alert_user(DeviceId);
        If User_response = RESPONSE_OK Then Begin
            Call save_snapshot(DeviceId, current);
        End Else Begin
            Call restore_from_snapshot(DeviceId, snapshot);
        End;
    End;
    Call Free_memory(snapshot);
    Call Free_memory(current);
    End;
End;
```

The modules and submodules described herein can be implemented as hardware, software, or a combination thereof.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the invention are as follows:

1. A method of scanning firmware of a processing system for malware, wherein the method comprises:
   obtaining a list of firmware devices in communication with the processing system;
   obtaining a copy of firmware stored in the processing system for at least one firmware device in the list; and
   analysing the copy of the firmware for the at least one firmware device to determine if the firmware has been modified by malware.

2. The method according to claim 1, wherein the method comprises:
   storing uncompromised firmware; and
   in the event that malware has been determined to have modified the copy of the firmware, repairing the firmware using the uncompromised firmware.

3. The method according to claim 1, wherein the step of analysing the copy of the firmware is performed using a detection module, wherein the detection module comprises a plurality of submodules comprising at least one of a cryptographic hash module, a checksum module, a disassembly module, and a pattern matching module, wherein the method comprises analysing, using the plurality of submodules, the copy of the firmware to determine if the firmware has been modified by malware.

4. The method according to claim 3, wherein the method comprises:
   generating, using the cryptographic hash module, a cryptographic hash value of the copy of the firmware; and
   comparing the cryptographic hash value to a database to determine whether the firmware has been modified by malware, wherein the database comprises a plurality of cryptographic hash values indicative of at least one of malicious entities and non-malicious entities.

5. The method according to claim 3, wherein the method comprises:
generating, using the checksum module, a checksum value of the copy of the firmware; and
comparing the checksum value to a list to determine whether the entity is malicious, wherein the list comprises a plurality of checksum values associated with at least one or malicious entities and non-malicious entities.

6. The method according to claim 3, wherein the method comprises:
disassembling, using the disassembly module, at least a portion of the copy of the firmware; and
performing a comparison, using the pattern matching module, between the disassembled entity and a list of patterns associated with malicious activity.

7. The method according to claim 1, wherein in the event the analysis indicates that the firmware has not been modified by malware, the method comprises storing an uncompromised copy of the firmware.

8. The method according to claim 7, wherein in the event the analysis indicates that the firmware has been modified by malware, the method comprises:
retrieving the uncompromised copy of the firmware; and
copying the uncompromised copy of the firmware for a firmware device containing the modified firmware.

9. The method according to claim 1, wherein the method comprises:
iteratively analyzing the firmware for each firmware device in the list.

10. A method of scanning firmware of a processing system for malware, wherein the method comprises:
obtaining a copy of firmware stored in the processing system; and
analysing the copy of the firmware to determine if the firmware has been modified by malware;
wherein in the event the analysis indicates that the firmware has not been modified by malware, the method comprises:
storing an uncompromised copy of the firmware;
retrieving the uncompromised copy of the firmware for a firmware device; and
performing a comparison between the firmware of the firmware device and the retrieved uncompromised copy of the firmware to determine if the firmware has been modified by malware.

11. A method of scanning firmware of a processing system for malware, the method comprises:
obtaining a copy of firmware stored in the processing system; and
analysing the copy of the firmware to determine if the firmware has been modified by malware;
wherein in the event that the firmware is determined to have been modified by malware, the method comprises:
generating a report indicating that a firmware device comprises firmware modified by malware; and
transferring the report to a server processing system.

12. The method according to claim 11, wherein the report is indicative of:
the copy of the modified firmware;
a firmware device identity;
a firmware device associated with the firmware; and
an identity associated with the mal ware which modified the firmware.

13. The method according to claim 11, wherein the method comprises displaying the report using the processing system.

14. The method according to claim 2, wherein repairing the firmware comprises configuring the processing system to reboot and execute a bootable program prior to booting an operating system installed on the processing system, wherein the bootable program is configured to enable modifications to be performed to the firmware.

15. A computer program product for a processing system, the computer program product comprising a non-transitory computer readable medium having a computer program recorded therein or thereon, the computer program product being configured to scan firmware of the processing system for malware, wherein the computer program product configures the processing system to:
obtain a list of firmware devices in communication with the processing system;
copy the firmware for at least one firmware device stored in the processing system; and
analyse the copy of the firmware for the at least one firmware device to determine if the firmware has been modified by malware.

16. A system to scan firmware of a processing system for malware, wherein the system comprises:
a processor;
memory in electronic communication with the processor;
a firmware detection module configured to obtain a list of firmware devices in communication with the processing system;
a copy module configured to copy the firmware for at least one firmware device stored in the processing system; and
the analysis module configured to analyse the copy of the firmware for the at least one firmware device to determine if the firmware has been modified by malware.

17. The system according to claim 16, wherein the system includes a storage module configured to store uncompromised firmware; and
a repair module configured to repair the firmware using the uncompromised firmware in the event that mal ware has been determined to have modified the copy of the firmware.

18. The system according to claim 16, wherein the analysis module includes a detection module, wherein the detection module comprises a plurality of submodules comprising at least one of a cryptographic hash module, a checksum module, a disassembly module, and a pattern matching module.

* * * * *